(12) United States Patent
Hu

(10) Patent No.: US 11,668,463 B2
(45) Date of Patent: Jun. 6, 2023

(54) COMBUSTOR WITH DILUTION HOLES

(71) Applicant: PRATT & WHITNEY CANADA CORP., Longueuil (CA)

(72) Inventor: Tin-Cheung John Hu, Markham (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/392,884

(22) Filed: Aug. 3, 2021

(65) Prior Publication Data

US 2023/0044804 A1    Feb. 9, 2023

(51) Int. Cl.
| F23R 3/06 | (2006.01) |
| F23R 3/00 | (2006.01) |
| F23M 5/08 | (2006.01) |
| F02C 7/18 | (2006.01) |

(52) U.S. Cl.
CPC ............... *F23R 3/06* (2013.01); *F23R 3/002* (2013.01); *F02C 7/18* (2013.01); *F05D 2260/202* (2013.01); *F23M 5/085* (2013.01); *F23R 2900/00012* (2013.01); *F23R 2900/03041* (2013.01); *F23R 2900/03042* (2013.01); *F23R 2900/03044* (2013.01)

(58) Field of Classification Search
CPC .. F23R 3/06; F23R 3/002; F23R 2900/00012; F23R 2900/03041; F23R 2900/03042; F23R 2900/03044; F02C 7/18; F05D 2260/202; F23M 5/085
See application file for complete search history.

(56) References Cited

U.S. PATENT DOCUMENTS

| 4,653,279 | A | 3/1987 | Reynolds |
| 2010/0236248 | A1* | 9/2010 | Kaleeswaran ............ F23R 3/06 60/752 |
| 2014/0216044 | A1 | 8/2014 | Erbas-Sen et al. |
| 2015/0354819 | A1 | 12/2015 | Snyder et al. |
| 2015/0369487 | A1* | 12/2015 | Dierberger ................ F23R 3/06 60/755 |
| 2016/0025342 | A1* | 1/2016 | Erbas-Sen ............... F23R 3/007 415/178 |

(Continued)

OTHER PUBLICATIONS

European Search report dated Jan. 3, 2023 for corresponding application No. 22187099.1.

*Primary Examiner* — Gerald L Sung
*Assistant Examiner* — Rene D Ford
(74) *Attorney, Agent, or Firm* — Norton Rose Fulbright Canada LLP

(57) ABSTRACT

A combustor of an aircraft engine comprises a liner defining a primary and a dilution zone having a hot surface exposed to a flow of combustion gases traveling from the primary zone downstream to the dilution zone and a cold surface. Dilution holes extending through the liner from the cold to the hot surface delimit the primary from the dilution zone. Effusion holes extending through the liner from the cold to the hot surface direct cooling air into the dilution zone. Two or more rows of effusion holes positioned within three dilution hole diameters downstream of the dilution holes are oriented relative to the liner to direct the cooling air in a cooling direction that is at least one of normal to the direction of the flow of gases passing adjacent the effusion holes, and against the direction of the flow of gases passing adjacent the effusion holes.

20 Claims, 7 Drawing Sheets

(56) References Cited

U.S. PATENT DOCUMENTS

| | | | |
|---|---|---|---|
| 2016/0040879 A1* | 2/2016 | Dierberger | F23R 3/002 |
| | | | 60/754 |
| 2016/0238250 A1 | 8/2016 | Moura et al. | |
| 2016/0238253 A1* | 8/2016 | Moura | F23R 3/002 |
| 2018/0283689 A1 | 10/2018 | Wang et al. | |
| 2019/0085767 A1 | 3/2019 | Vise et al. | |
| 2019/0101289 A1 | 4/2019 | Mongillo, Jr. et al. | |
| 2020/0208840 A1* | 7/2020 | Sauer | B22F 10/28 |

* cited by examiner

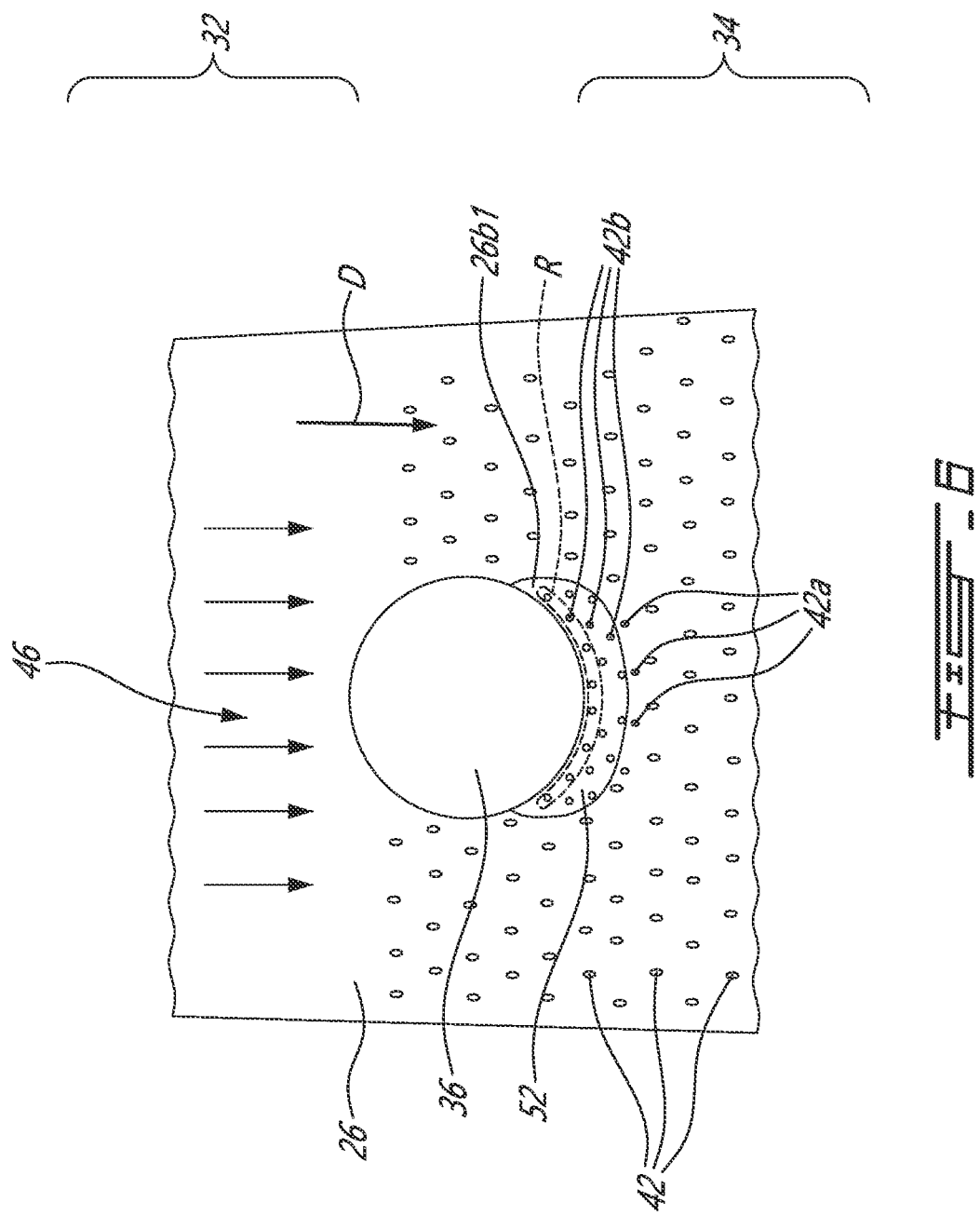

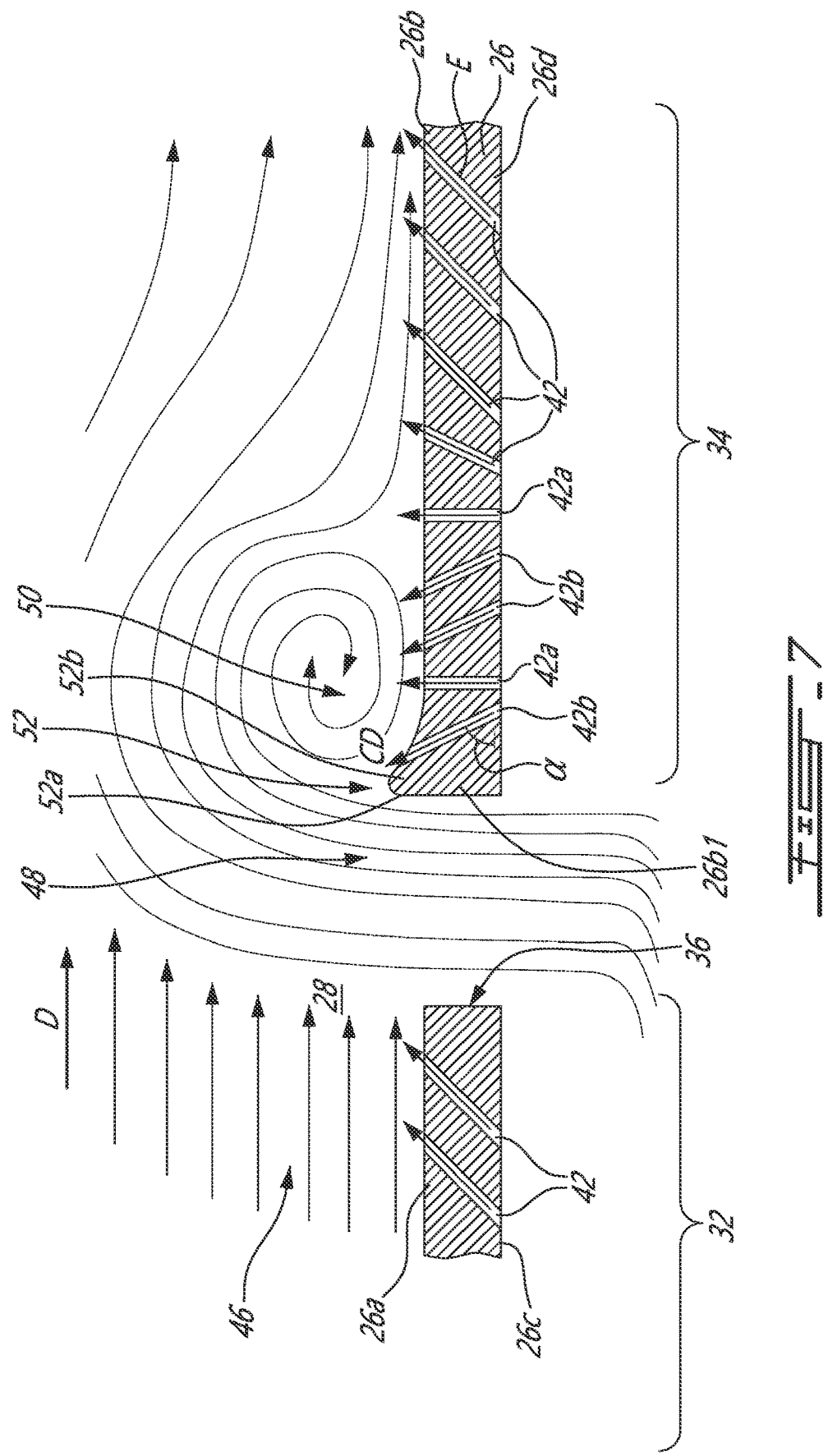

COMBUSTOR WITH DILUTION HOLES

TECHNICAL FIELD

The disclosure relates generally to aircraft engines and, more particularly, to combustors for aircraft engines.

BACKGROUND

Combustors of aircraft engines are subject to high temperatures, and effusion openings may be used to direct air to cool combustor components such as combustor liners, domes and heat shields. Typical effusion openings may extend through outer or inner skins of the combustor at shallow angles with respect to the surface of the component for efficiently cooling without risking a reduction in combustion temperatures. Such effusion openings may be positioned downstream of dilution openings which provide significant mass flow to dilute an otherwise fuel-rich gas flow in the combustor.

The local wake area of the dilution openings downstream of these dilution openings, may become oxidized due to a lack of cooling and the presence of a hot recirculating gas flow created by the mixture of the combustor gas flow and the dilution jet. This may reduce the durability of the heat shield.

SUMMARY

There is disclosed a combustor of an aircraft engine, comprising: a liner having a hot surface for being exposed to a flow of combustion gases and a cold surface, the liner defining a primary zone of the combustor and a dilution zone of the combustor, the combustor configured to cause the flow of combustion gases to travel through the combustor from the primary zone downstream to the dilution zone; a plurality of dilution holes extending through the liner from the cold surface to the hot surface, the plurality of dilution holes delimiting the primary zone from the dilution zone and having dilution hole diameters; and a plurality of effusion holes extending through the liner from the cold surface to the hot surface to direct cooling air into the dilution zone, two or more rows of effusion holes of the plurality of effusion holes positioned within three dilution hole diameters downstream of the plurality of dilution holes, the two or more rows of effusion holes oriented relative to the liner to direct the cooling air in a cooling direction that is at least one of normal to the direction of the flow of combustion gases passing adjacent the effusion holes, and against the direction of the flow of combustion gases passing adjacent the effusion holes.

There is disclosed a combustor for an aircraft engine, comprising: a doubled-walled combustor liner defining a combustion chamber, the combustor configured to cause a flow of combustion gases to travel through the combustion chamber from a primary zone of the combustion chamber downstream to a dilution zone of the combustion chamber, the doubled-walled combustor liner having an inner skin exposed to the flow of combustion gases and an outer skin, the inner and outer skins defining a gap therebetween, the inner and outer skins having a plurality of dilution holes defined therethrough adjacent a junction between the primary zone and the dilution zone; and the dilution zone having a plurality of effusion holes extending through the inner skin and positioned downstream of the plurality of dilution holes to introduce cooling air into the combustion chamber, two or more rows of effusion holes of the plurality of effusion holes positioned downstream of the plurality of dilution holes relative to a direction of the flow of combustion gases, the two or more rows of effusion holes being the effusion holes of the plurality of effusion holes that are closest to the plurality of dilution holes, each of the two or more rows of effusion holes configured to direct the cooling air into the combustion chamber at an angle that is at least one of normal to the direction of the flow of combustion gases, and towards the direction of the flow of combustion gases.

There is disclosed a method for manufacturing a combustor for an aircraft engine, comprising: providing a liner for the combustor having a hot surface and a cold surface; forming a plurality of dilution holes extending through the liner from the cold surface to the hot surface, the dilution holes having dilution hole diameters; and forming a plurality of effusion holes extending through the liner from the cold surface to the hot surface via one of laser or waterjet drilling or 3D printing, two or more rows of effusion holes of the plurality of effusion holes positioned within three dilution hole diameters downstream of the plurality of dilution holes relative to a combustor inlet, the two or more rows of effusion holes having effusion hole inlets and effusion hole outlets that are at least one of radially aligned and offset such that the effusion hole outlets are positioned upstream of the effusion hole inlets relative to the combustor inlet.

There is disclosed a heat shield panel for a combustor of an aircraft engine, comprising: a hot surface for being exposed to a flow of combustion gases and a cold surface, the heat shield panel defining a primary zone of the combustor and a dilution zone of the combustor, the combustor configured to cause the flow of combustion gases to travel through the combustor from the primary zone downstream to the dilution zone; a plurality of dilution holes extending through the heat shield panel from the cold surface to the hot surface, the plurality of dilution holes delimiting the primary zone from the dilution zone; and a plurality rows of effusion holes extending through the heat shield panel from the cold surface to the hot surface, two or more rows of effusion holes of the plurality of effusion holes positioned immediately downstream of the plurality of dilution holes relative to a combustor inlet, the two or more rows of effusion holes having effusion hole inlets and effusion hole outlets that are at least one of radially aligned, and offset such that the effusion hole outlets are positioned upstream of the effusion hole inlets relative to the combustor inlet.

BRIEF DESCRIPTION OF THE DRAWINGS

Reference is now made to the accompanying figures in which:

FIG. 6 is an top perspective view of the portion of the combustor shown in FIG. 5; and FIG. 7 is an enlarged view of a portion of a combustor according to another embodiment of the present disclosure.

DETAILED DESCRIPTION

Figure 1:
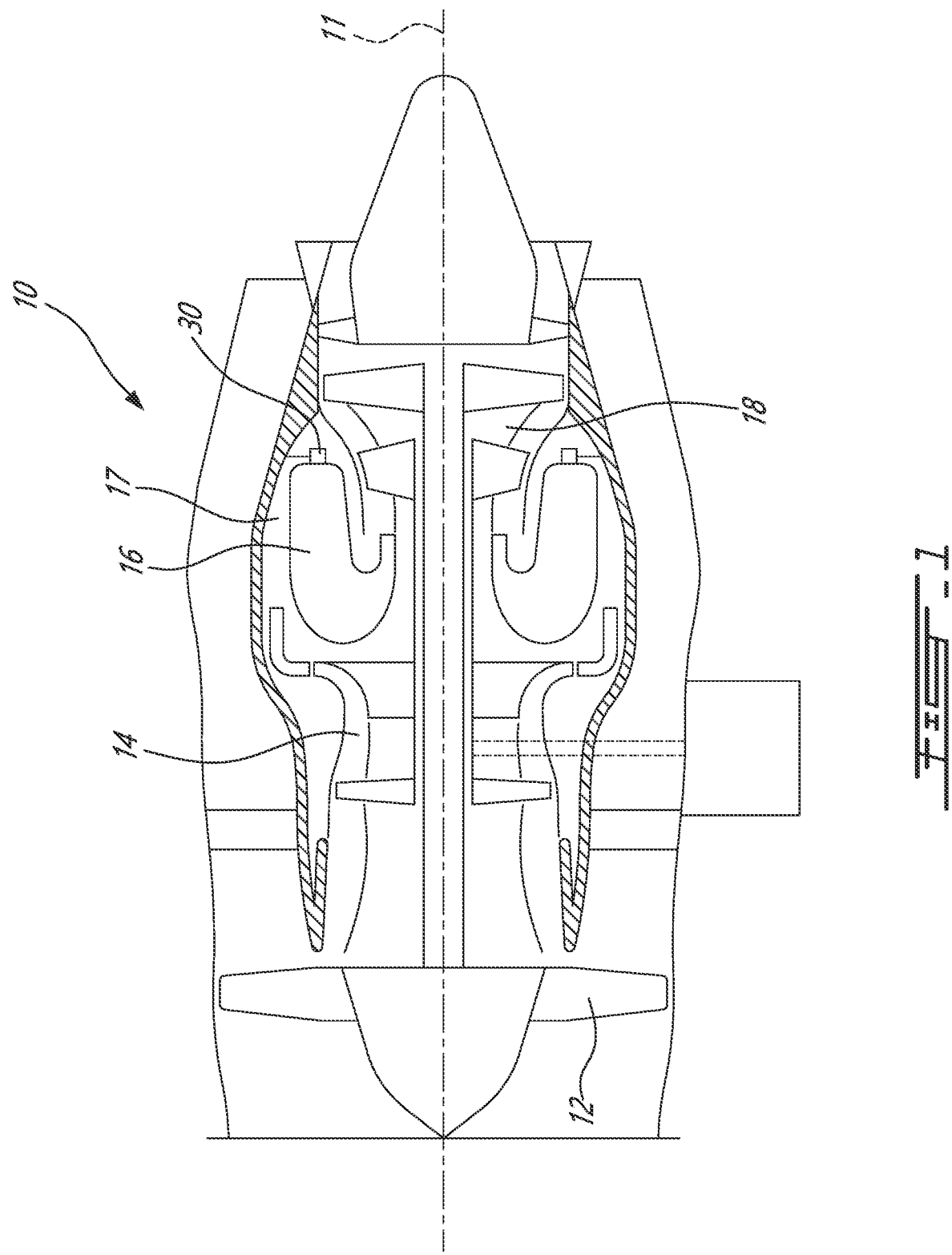
FIG. 1 is a schematic cross-sectional view of a gas turbine engine.

FIG. 1 illustrates a gas turbine engine 10 of a type preferably provided for use in subsonic flight, generally comprising in serial flow communication along a central axis 11 a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. While FIG. 1 shows engine 10 to be a turbofan-type engine, the present disclosure is applicable to other types of aircraft engines as well, in both axial and reverse flow configurations.

Figure 2:
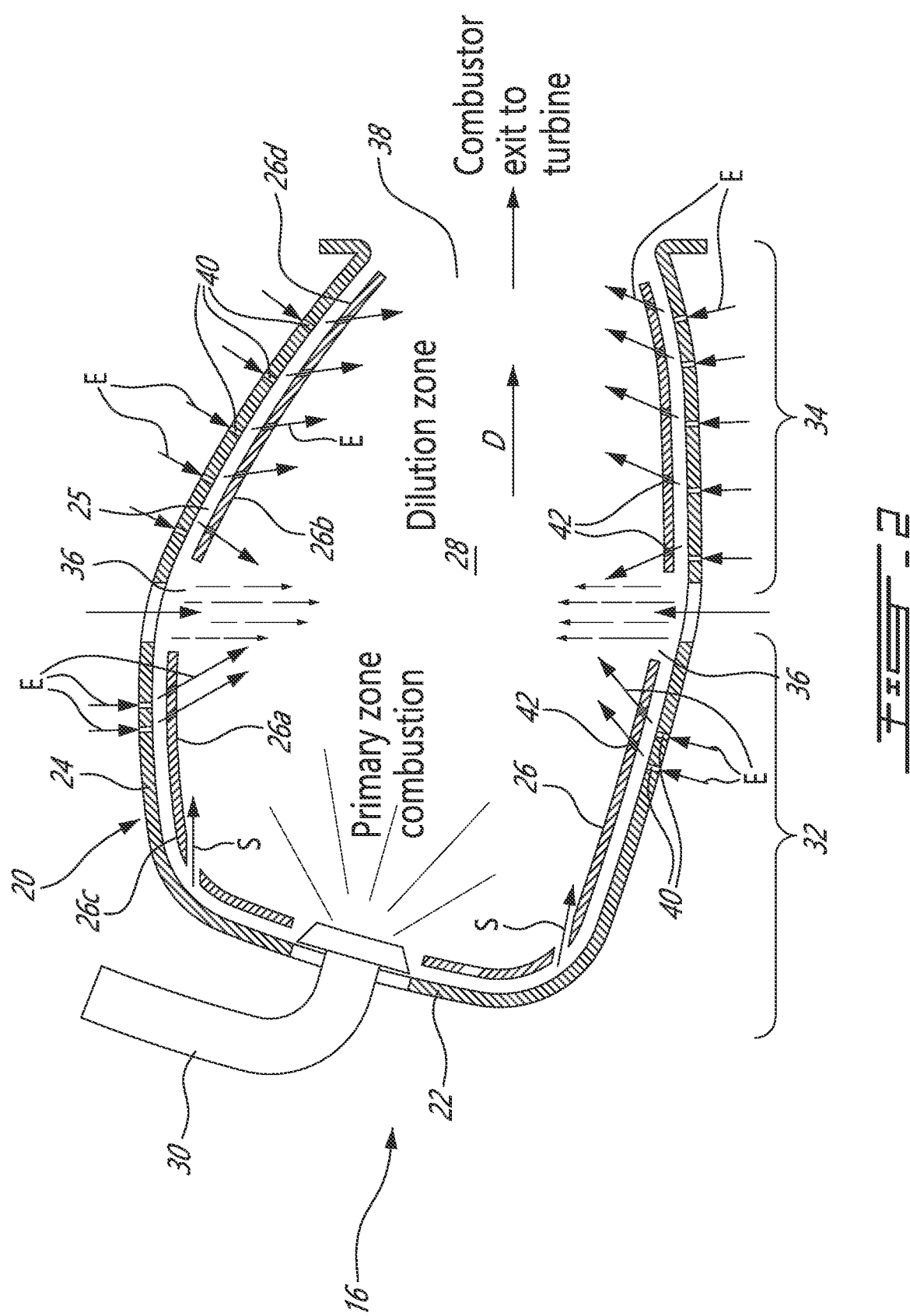
FIG. 2 is a schematic view of a combustor of the engine shown in FIG. 1.

FIG. 2 shows a possible configuration of the combustor 16. The combustor 16 may be a can-type, axial-flow or reverse-flow or radial-flow combustor. The illustrated combustor 16 has a double-walled combustor liner 20, sometimes referred to as a "double-walled combustor shell 20" or a "double-skin combustor liner 20". The combustor liner 20 includes an outer skin 24 and an inner skin 26 extending from a dome 22 to define a combustion chamber 28. The present disclosure may also apply to single-walled combustors, sometimes referred to as a "single-skin" combustors, as will be discussed in further detail below. An air gap 25 is defined between the radially spaced-apart outer and inner skins 24, 26 for receiving cooling air. Such cooling air may, for instance, be compressed high pressure air from the compressor section 14, although other sources for the cooling air may be contemplated as well. The inner skin 26 is typically provided in the form of heat shield panels bolted or otherwise suitably mounted to the inner surface of the outer skin 24. Various connections between the outer and inner skins 24, 26 may be contemplated, for instance via studs, fasteners, tabs, brackets, etc. The inner skin 26 may be removable and replaceable, for instance when damaged (e.g. by oxidation). The inner skin 26 thus includes a cold surface exposed to the air outside of the combustor 16, and a hot surface exposed to the combustion gases, as will be discussed in further detail below.

A circumferential array of spaced-apart fuel nozzles 30 (only one of which is shown in FIG. 2) is provided at the dome 22 or combustor inlet for injecting a mixture of fuel and air into the combustion chamber 28. The combustion takes place in a primary zone 32 of the combustion chamber 28. The combustion chamber 28 also has a dilution zone 34 downstream of the primary zone 32. A role of the dilution zone 34 may be to reduce the temperature of the combustion products and mix the resultant gases in order to establish a temperature that will uphold the integrity of the turbine blades downstream from the combustor 16. In addition, the fuel-to-air ratio in the primary zone 32 may be quite fuel rich, so the introduction of a dilution flow may dilute this mixture. To that end, one or more dilution holes 36, for instance a circumferential array of dilution holes 36, may be defined through the combustor liner 20 downstream of the primary zone 32. Some configurations of the combustor 16 may have multiple rows of dilution hole 36, spanned axially along the combustor length between the primary zone 32 and the dilution zone 34 of the combustor 16. The dilution holes 36 may be specifically designed to quench the combustion process. The dilution zone 34 may extend from the dilution holes 36 to the outlet end 38 of the combustor 16. Referring to FIG. 2, each dilution hole 36 is a through hole that extends through the outer skin 24 and through the inner skin 26. Referring to FIG. 2, the dilution holes 36 delimit or separate the primary zone 32 from the dilution zone 34. Referring to FIG. 2, the primary zone 32 is upstream of the dilution holes 36, and the dilution zone 34 is downstream of the dilution holes 36, relative to the direction of the flow of combustion gases through the combustion chamber 28.

Referring to FIG. 2, the combustor 16 has impingement holes 40 that are defined through the outer skin 24 for directing impingement jets against the back or cold side of the inner skin 26 (e.g. against the heat shield panel cold portions 26c, 26d in the primary zone 32 and in the dilution zone 34, respectively). The impingement holes 40 may be distributed over the entire surface of the outer skin 24 to provide impingement cooling in the primary zone 32 as well as in the dilution zone 34. A plurality of effusion holes 42 extend through the inner skin 26 from the cold surface 26c, 26d to the hot surface 26a, 26b to provide cooling to the hot surface of the inner skin 26. The impingement holes 40 and effusion holes 42 have a substantially smaller diameter than that of the dilution holes 36. The effusion holes 42 have smaller diameters than those of the impingement holes 40. In one possible configuration, the effusion holes 42 each have a diameter of under thirty thousandths of an inch, although other diameters may be contemplated as well. The dilution holes 36 each have a diameter of typically over five hundredths of an inch. The impingement holes 40 typically have diameters in the order of fifty to one hundred thousandths of an inch; while the effusion holes 42 typically have diameters below thirty thousandths of an inch.

Referring to FIG. 2, in use, the cooling air (e.g. compressed air from the compressor section 14) that is discharged in the air plenum 17 (see FIG. 1) surrounding the combustor liner 20 cools the outer skin 24 of the combustor liner 20 via convection cooling as it flows over the outer surface thereof and as it flows through the impingement holes 40 defined therethrough. As depicted by arrows E, the cooling air then impinges upon the back surface (i.e. 'cold surface') of the inner skin 26 to provide impingement cooling over substantially the entire surface of the inner skin 26. The cooling air then passes through the effusion holes 42 defined through the inner skin 26 to create a cooling film along an inner surface (i.e. hot surfaces, such as 26a and 26b) of the inner skin 26. The cooling air also provides additional cooling to the inner skin 26 as it passes through the effusion holes 42 via conduction.

Figure 3:
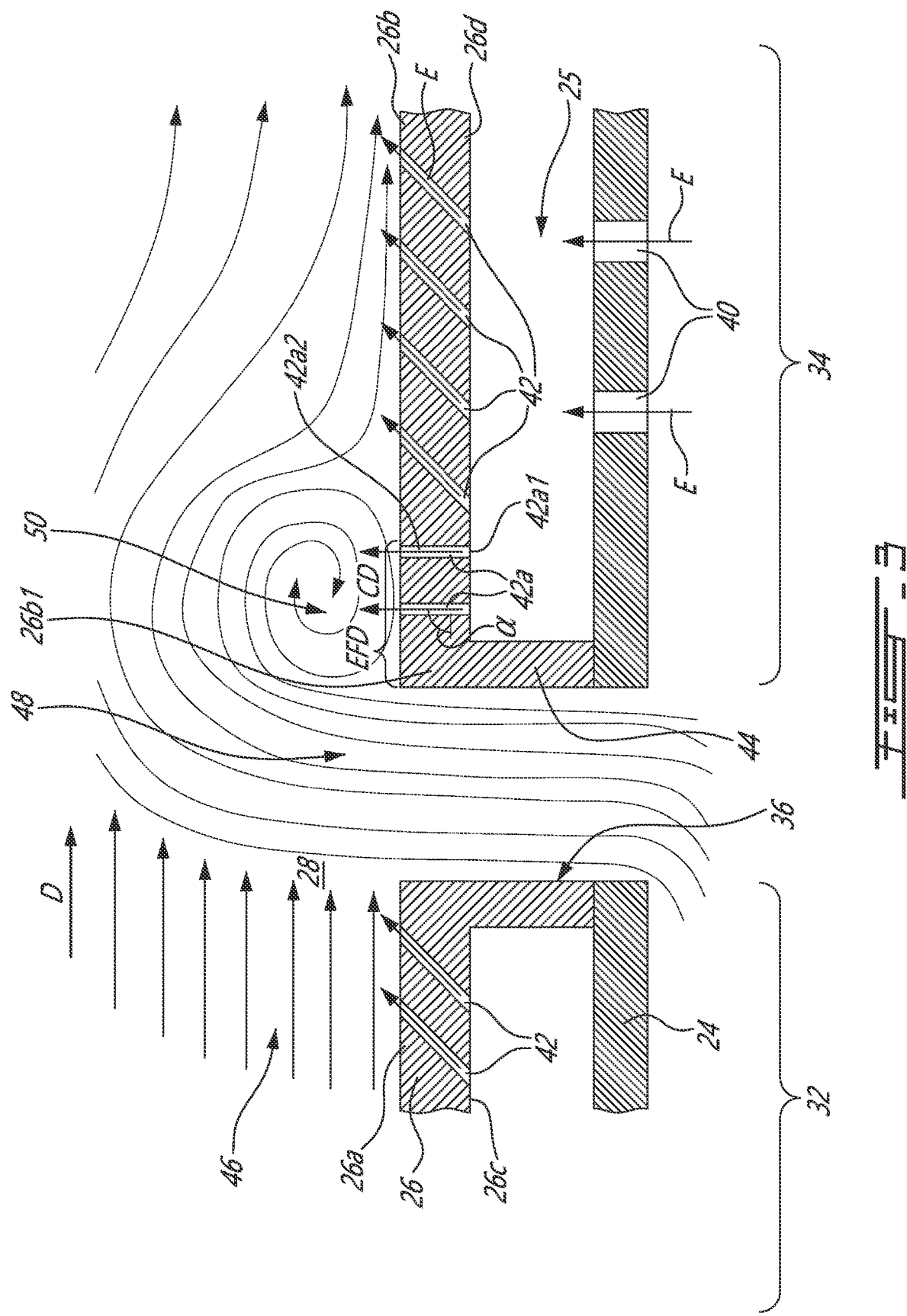
FIG. 3 is an enlarged view of a portion of the combustor shown in FIG. 2 according to an embodiment of the present disclosure.

Referring to FIG. 3, a plurality of grommets 44 (only one of which is shown) are mounted to the inner skin 26 and define and delineate the dilution holes 36. Referring to FIG. 3, the grommets 44 are integral with the inner skin 26. Referring to FIG. 3, the grommets 44 and the inner skin 26 form a one-piece construction or component. Referring to FIG. 3, the grommets 44 and the inner skin 26 are made into a single component during their manufacture, such as by casting, metal injection molding or 3D printing. In an alternative embodiment, the grommets 44 may be separate components that are attachable to the outer skin 24 and/or to the inner skin 26. The grommets 44 may be metal or cast components. A flow of combustion gases 46 travels through the combustion chamber 28 in a direction D from the fuel nozzles 30, through the primary zone 32 along a downstream direction, through the dilution zone 34, and through the outlet end 38 of the combustor 16. Although the direction D of the flow of combustion gases 46 may be made up of a plurality of velocity vectors (e.g. radial vectors, axial vectors, and swirl or circumferential vectors), the velocity and directional vectors of the direction D which have the largest magnitude (the bulk combustor flow) are those that are parallel to a line extending from the combustor inlet to the outlet end 38. As the flow of combustion gases 46 in the combustor 16 cross flows over the multiple dilution jet flows 48, it mixes with the newly introduced dilution cooling flow jet 48 via the dilution holes 36, and a horseshoe vortex is generated in the downstream side of each dilution jet 48. This may be referred to as a horseshoe vortex in a jet-in-a-cross-flow (JICF). A hot flow 50 recirculates in the wake (i.e. downstream) of the dilution jet 48. The effusion holes 42 are oriented to direct the cooling air E in the same direction as the major component of the direction D of the flow of combustion gases 46 to create a cooling film on the hot side of the heat shield panels sections 26a, 26b. By "same direction as the major component of the direction D of the flow of combustion gases 46", it is understood that the orientation of the effusion holes 42 introduces the cooling air E into the combustion chamber 28 along a direction that has a vector that is parallel to the direction D and which has a magnitude that is much larger than the vector of the direction that is normal to the direction D. In some conventional combustors, a portion 26b1 of the heat shield panel 26b immediately downstream of the dilution holes 36 may not be exposed to the cooling air E provided by any of the effusion holes 42, such that the portion 26b1 may experience local oxidation due to the recirculating hot flow 50.

The combustor 16 disclosed herein may provide local cooling to the portion 26b1 in order to help the portion 26b1 avoid local oxidation and further increase the lifespan of the heat shield 26 and/or of the combustor 16.

This may be achieved in different ways. For example, and referring to FIG. 3, the heat shield panel section 26b in the dilution zone 34 includes two or more rows of effusion holes 42a downstream of the dilutions holes 36 relative to the direction D of the flow of combustion gases 46. The number of effusion holes 42a in a given row may vary. In various cases, a row of effusion holes 42a may extend circumferentially within the combustor 16 and roughly span the diameter of a respective dilution hole 36. Other rows of effusion holes 42a may be wider or narrower than a diameter of a respective dilution hole 36. The effusion holes 42a are oriented to direct the cooling air E in a cooling direction CD that aims to cool the portion 26b1 that may experience local oxidation. By "immediately downstream", it is understood that the two or more rows of effusion holes 42a are the closest effusion holes 42 to the dilution holes 36. The two or more rows of effusion holes 42a may be within a distance EFD from the downstream edge of the nearest dilution hole 36. The distance EFD may vary. For example, and referring to FIG. 3, the distance EFD is less than three dilution hole diameters. For example, and referring to FIG. 3, the distance EFD is less than two dilution hole diameters. Referring to FIG. 3, the effusion holes 42a extend through the heat shield panel section 26b at an angle a of 90 degrees, such that the cooling air E travels along a direction that is normal to the direction D of the flow of combustion gases 46 that are passing in front of, or adjacent to, the effusion holes 42. Referring to FIG. 3, the effusion holes 42a are defined by a center axis that is straight, where the center axis of the effusion holes 42a is normal to the direction D. Referring to FIG. 3, the inlets 42a1 of the effusion holes 42a are radially aligned with the outlets 42a2 of effusion holes 42a. Such cooling air E is thus injected directly in the wake of the dilution cooling jet flow 48, i.e. in the horseshoe vortex 50 created immediately downstream of the dilution holes 36. In some cases, the effusion hole or holes 42a most proximal to the dilution holes 36 may be partially drilled, 3D printed or otherwise formed through the outer parts of the grommets 44 (i.e. the parts closest to the combustion chamber 28). The number of effusion holes 42a and spacing between effusion holes 42a may vary. While the downstream and angled effusion holes 42 may create a cooling film on the hot side of the heat shield panel 26b, the effusion holes 42a normal to the flow of combustion gases 46 may provide cooling by jetting the cooling air E directly into the recirculating hot flow 50. In addition, the normal effusion holes 42a provide cooling directly to the body and hot surface of the heat shield panel 26b via conduction. While FIG. 3 shows a cross-sectional view of the combustor 16 and thus shows the various effusion holes 42, 42a being linear passages, it is to be understood that various arrangements of effusion holes 42, 42a surrounding the dilution holes 36 may be contemplated.

Figure 4:
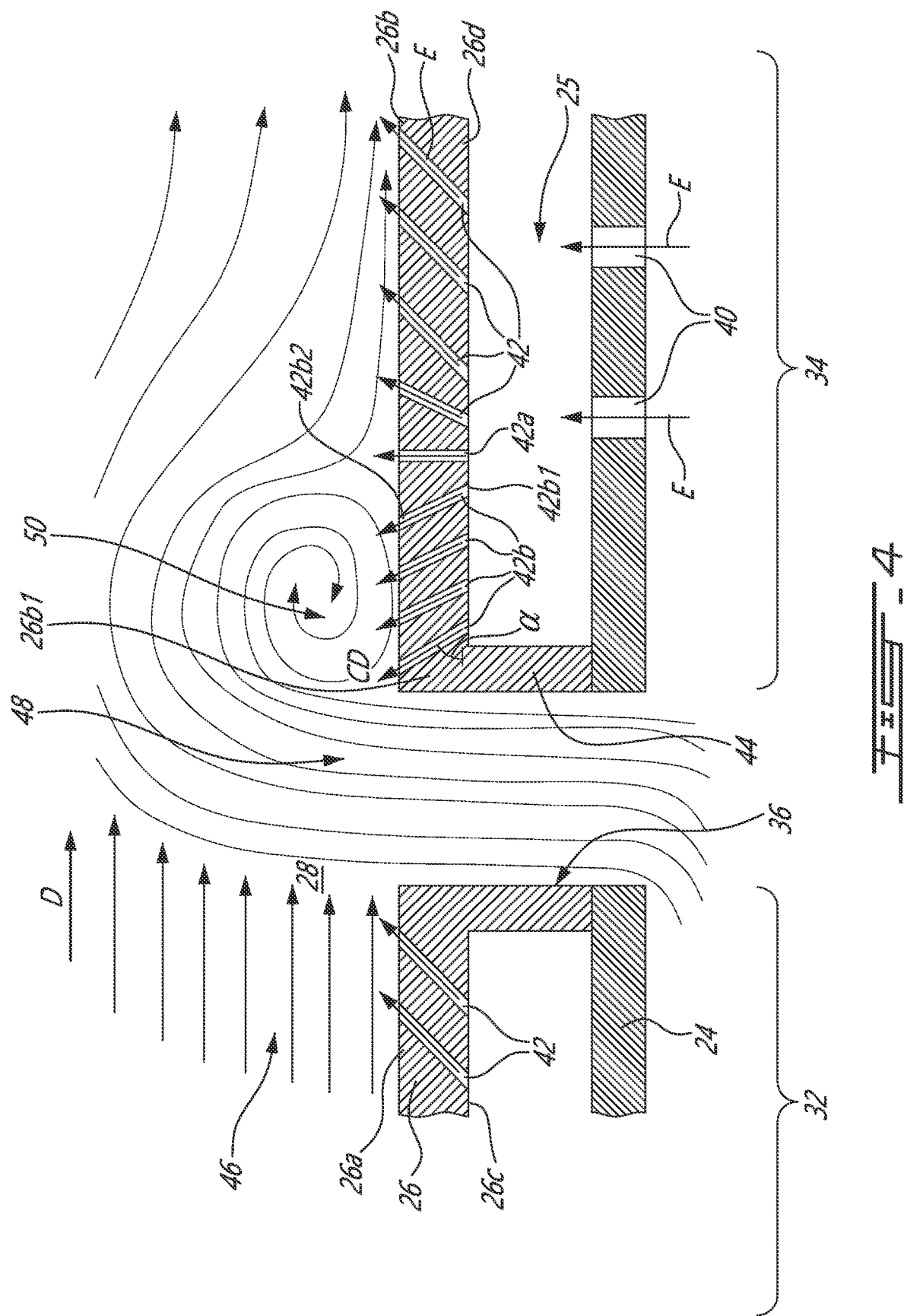
FIG. 4 is an enlarged view of a portion of the combustor shown in FIG. 2 according to another embodiment of the present disclosure.

Another possible configuration for cooling the portion 26b1 is shown in FIG. 4. The heat shield panel 26 in the dilution zone 34 includes effusion holes 42a (only one of which is shown in FIG. 4) downstream of the dilutions holes 36 that are oriented to direct the cooling air E in the cooling direction CD normal to the direction D of the flow of combustion gases 46. The dilution zone 34 also has effusion holes 42b (four of which are shown in FIG. 4) immediately downstream of the dilution holes 36 that are oriented to deliver the cooling air E in the cooling direction CD opposite to, or against, the direction D of the flow of combustion gases 46. By "opposite to, or against, the direction D of the flow of combustion gases 46", it is understood that the orientation of the effusion holes 42b introduces the cooling air E into the combustion chamber 28 along a direction that has a vector that is opposite to the direction D, and that has a vector that is normal to the direction D. As shown in FIG. 4, the effusion holes 42b extend through the heat shield panel section 26b at an angle a of less than 90 degrees relative to direction D. Referring to FIG. 4, the inlets 42b1 of each effusion hole 42b are positioned downstream of the outlets 42b2, relative to the direction D of the flow of combustion gases 46. As was the case in FIG. 3, the number of respective effusion holes 42a, 42b and spacing between effusion holes 42a, 42b may vary. Various combinations of effusion holes 42a, 42b and arrangements surrounding dilutions holes 36 may be contemplated. Two or more rows of effusion holes 42a, 42b may be within a distance EFD from the downstream edge of the nearest dilution hole 36. The distance EFD may vary. For example, and referring to FIG. 3, the distance EFD is less than three dilution hole diameters. For example, and referring to FIG. 3, the distance EFD is less than two dilution hole diameters. The effusion holes 42b are operable to inject the cooling air E in the same direction or orientation as the recirculating hot flow 50 immediately downstream of the dilution holes 36. By directing the cooling air E to flow in the same flow direction of the recirculating hot flow 50, the recirculating hot flow 50 may be rapidly diluted (i.e. cooled), and its potential oxidation impact on the portion 26b1 reduced or eliminated. As was the case in FIG. 3, the effusion hole or holes 42b most proximal to a respective dilution hole 36 may be partially drilled, 3D printed or otherwise formed through the respective grommet 44.

Various combinations of the above-described effusion holes 42a, 42b immediately downstream of the dilutions holes 36 may be contemplated. For instance, a heat shield panel 26b may include two or more rows of effusion holes 42a immediately downstream of the dilution holes 36 oriented to direct the cooling air E in a cooling direction CD that is normal to the direction D of the flow of combustion gases 46. In other cases, a heat shield panel 26b may include two or more rows of effusion holes 42b immediately downstream of the dilution holes 36 oriented to direct the cooling air E in a cooling direction CD that is against the direction D of the flow of combustion gases 46. In other cases, a heat shield panel 26b may include one or more effusion hole 42a immediately downstream of the dilution holes 36 oriented to direct the cooling air E in a cooling direction CD that is normal to the direction D of the flow of combustion gases 46 and one or more effusion hole 42b immediately downstream of the dilution holes 36 oriented to direct the cooling air E in a cooling direction CD that is against the direction D of the flow of combustion gases 46. Various orders and combinations of the effusions holes 42b may be contemplated as well. Referring to FIG. 4, the outlets 42b1, 42b2 of the effusion holes 42a, 42b are free from overlap from portions of the combustor liner 20. Referring to FIG. 4, no portion of the combustor liner 20 is positioned over or overlays the outlets 42b1, 42b2 of the effusion holes 42a, 42b, such that they are free to introduce the cooling air E into the combustion chamber 28 without any interference from features of the combustor 16 and/or of the combustor liner 20.

Figure 5:
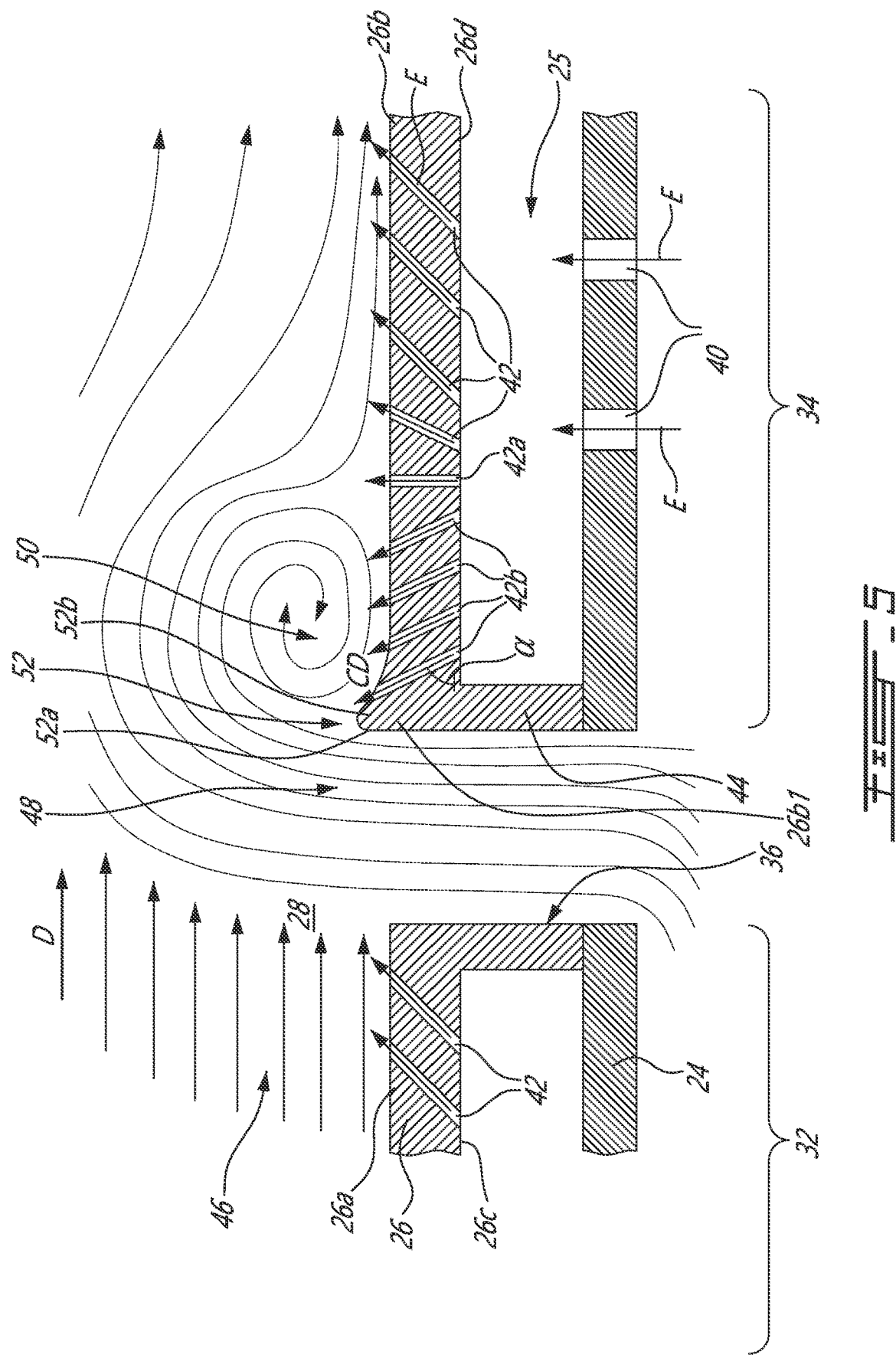
FIG. 5 is an enlarged view of a portion of the combustor shown in FIG. 2 according to an embodiment of the present disclosure.

Yet another possible configuration for cooling the portion 26b1 is shown in FIG. 5. In addition to the effusion holes 42a, 42b directing the cooling air E normal to the hot combustor gas flow and/or against the combustor gas flow, the portions 26b1 of the heat shield panel 26b immediately downstream of the dilution holes 36 may include endwall contours 52. The endwall contours 52 are features of the combustor liner 20 that form raised or thicker regions in the wake side of the dilution holes 36 and partially delimit the dilution holes 36. The endwall contours 52 delimit the dilution holes 36 along a downstream edge of the dilution holes 36 (see FIG. 6). By "thicker", it is understood that endwall contour 52 forms a local protrusion of the inner skin 26 which has a thickness that is greater than a thickness of the remainder of the inner skin 26 away from the endwall contour 52, where thickness is defined in a direction extending between the hot and cold surfaces of the inner skin 26. Referring to FIG. 5, the inner skin 26 and/or the heat shield panel 26b has a constant thickness along its length save for the thickness endwall contour 52. The endwall contour 52 may cause the vortex 50 in the wake of the dilution cooling flow jet 48 to negotiate the entry corner in a more stable fashion. The steepness of the endwall contour 52 may vary, for instance based on the desired cooling effect. The dilution cooling flow jet 48 may thus be strengthened, allowing it to penetrate further into the main hot flow of combustion gases 46. In addition, the added thickness to this typically distressed portion 26b1 may improve the overall durability of the heat shield panel 26b. Referring to FIG. 5, the endwall contours 52 may be, or may form, a protrusion extending from the hot surface of the inner skin 26 into the flow of combustion gases 46. The protrusion includes an upstream wall 52a extending from the hot surface and delimiting the plurality of dilution holes 36. The protrusion also includes a downstream wall 52b extending from the upstream wall 52a towards the hot surface in a downstream direction relative to the direction D of the flow of combustion gases 46. In the shown case, but not necessarily in all cases, the downstream wall 52b is curved. This curvature is concave when viewed from within the combustion chamber 28. The curvature may also be convex. Additionally or alternatively, the upstream wall 52a may delimit the plurality of dilution holes 36, with the upstream wall 52a delimiting a volume of the dilution holes 36 that is free of overlap by the upstream wall 52a. Stated differently, the dilution cooling flow jet 48 is able to penetrate into the combustion chamber 28 without being obstructed by components of the endwall contour 52. Two or more rows of effusion holes 42a, 42b may be within a distance EFD from the downstream edge of the nearest dilution hole 36. The distance EFD may vary. For example, and referring to FIG. 3, the distance EFD is less than three dilution hole diameters. For example, and referring to FIG. 3, the distance EFD is less than two dilution hole diameters.

As shown in FIG. 5, the effusion hole 42b most proximal to a given dilution hole 36 may extend through the endwall contour 52, providing additional cooling to the endwall contour 52 which may be predisposed to oxidation. Various combinations of effusion hole sizing, positioning and arrangements around the dilution holes 36 may be contemplated. Referring to FIG. 5, the effusion hole 42b closest to the endwall contour 52 extends through an inner portion of the endwall contour 52 that is closer to the combustion chamber 28 than to the cold surface of the inner skin 26. Referring to FIG. 5, the effusion hole 42b closest to the endwall contour 52 extends through an inner portion of the endwall contour 52 such that the outlet of the effusion hole 42b opens on the downstream wall 52b.

Referring to FIG. 6, one of the endwall contours 52 may surround a downstream area of a given dilution hole 36. In this region, the effusion holes 42b may be angled against and/or normal to the direction D of the main hot flow of combustion gases 46, while the other effusion holes 42 on the inner skin 26 (i.e. heat shield), for instance upstream and downstream of the dilution hole 36, may be angled in a same direction as the main hot flow of combustion gases 46. As shown in FIG. 6, the first row R of angled effusion holes 42b may form an arc-like pattern around the downstream portion of the dilution hole 36, and extend a few rows of effusion holes 42b deep downstream, then transition into rows of effusion holes 42a and angled effusion holes 42 directing the cooling flow in a same direction as direction D further downstream of the dilution jet hole 36. The first row R of angled effusion holes 42B may circumferentially span the diameter of the diffusion hole 36, with effusion holes 42 on either side of row R. Subsequent rows R of effusion holes 42b downstream of the first row R may form an arc-like pattern as well around the downstream portion of the dilution hole 36. Other arrangements and combinations may be contemplated as well.

In different embodiments, the effusion holes 42, 42a, 42b may be formed in various shapes. In some cases, the effusion holes may be cylindrical with circular cross-sectional shapes, although other cross-sectional shapes may be contemplated as well, for instance elliptical, square-shaped, etc. Various manufacturing techniques for the effusion holes may be contemplated. For instance, the effusion holes may be cut through the inner skin 26 by percussion drilling using laser or waterjet drilling. In other cases, the inner skin 26 may be 3D-printed with the effusion holes via additive manufacturing or by metal injection molding and green machining. Other manufacturing methods may be contemplated as well.

In some embodiments, the combustor 16 may include a combustor liner 20 with a single skin configuration whereby the effusion holes 42 pass through a single, possible thicker, combustor liner skin. In such cases, the effusion holes 42 may pass directly through a thicker single skin 26. Referring to FIG. 7, an exemplary single-skin combustor liner 20 with a plurality of effusion holes 42, 42a, 42b is shown. The single skin 26 includes a single row of effusion holes 42a downstream of the dilution holes 36 oriented to direct the cooling air E in a direction that is normal to the direction D of the flow of combustion gases 46 and three rows of effusion holes 42b downstream of the dilution hole 36 oriented to direct the cooling air E in a direction that is against the direction D of the flow of combustion gases 46, one of which passes through the endwall contour 52 partially delimiting the dilution hole 36. Other combinations of effusion holes 42a, 42b in a single-skin combustor liner 20, with or without the endwall contour 52 shown, may be contemplated. Two or more rows of effusion holes 42a, 42b may be within a distance EFD from the downstream edge of the nearest dilution hole 36. The distance EFD may vary. For example, and referring to FIG. 3, the distance EFD is less than three dilution hole diameters. For example, and referring to FIG. 3, the distance EFD is less than two dilution hole diameters.

Referring to FIGS. 3 and 4, there is disclosed a method for manufacturing a combustor 16 for an aircraft engine 10. The method includes providing a liner 20 for the combustor 16. The method includes forming a plurality of dilution holes 36 extending through the liner 20. The method includes forming a plurality of effusion holes 42a, 42b extending through the liner 20. The effusion holes 42a, 42b may be formed via one of laser or waterjet drilling. Two or more rows of effusion holes 42a, 42b are positioned within three dilution hole diameters downstream of the plurality of dilution holes 36. The two or more rows of effusion holes 42a, 42b have effusion hole inlets 42a1, 42b1 and effusion hole outlets 42a2, 42b2 that are at least one of radially aligned, and offset such that the effusion hole outlets 42a2, 42b2 are positioned upstream of the effusion hole inlets 42a1, 42b1 relative to the combustor inlet 30.

Referring to FIGS. 3 and 4, there is disclosed a heat shield panel 26 for a combustor 16 of an aircraft engine 10. The heat shield panel 26 has a hot surface 26a, 26b for being exposed to a flow of combustion gases 46 and a cold surface 26c, 26d. The heat shield panel 26 defines a primary zone 32 of the combustor 16 and a dilution zone 34 of the combustor 16, the combustor 16 configured to cause the flow of combustion gases 46 to travel through the combustor 16 from the primary zone 32 downstream to the dilution zone 34. A plurality of dilution holes 36 extend through the heat shield panel 26 from the cold surface 26c, 26d to the hot surface 26a, 26b and have dilution hole diameters, the plurality of dilution holes 36 delimiting the primary zone 32 from the dilution zone 34. A plurality of effusion holes 42 extend through the heat shield panel from the cold surface to the hot surface. Two or more rows of effusion holes 42a, 42b are positioned within three dilution hole diameters downstream of the plurality of dilution holes 36. The two or more rows effusion holes 42a, 42b have effusion hole inlets 42a1, 42b1 and effusion hole outlets 42a2, 42b2 that are at least one of radially aligned, and offset such that the effusion hole outlets 42a2, 42b2 are positioned upstream of the effusion hole inlets 42a1, 42b1 relative to the combustor inlet 30.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A combustor of an aircraft engine, comprising:
   a liner having a hot surface for being exposed to a flow of combustion gases and a cold surface, the liner defining a primary zone of the combustor and a dilution zone of the combustor, the combustor configured to cause the flow of combustion gases to travel through the combustor from the primary zone downstream to the dilution zone;
   a plurality of dilution holes extending through the liner from the cold surface to the hot surface, the plurality of dilution holes delimiting the primary zone from the dilution zone and having dilution hole diameters, the liner including a plurality of endwall contours partially delimiting the plurality of dilution holes, the plurality of endwall contours having a thickness greater than a thickness of a remainder of the liner, the plurality of endwall contours including a protrusion extending from the hot surface into the flow of combustion gases, the protrusion including an upstream wall extending from the hot surface and delimiting the plurality of dilution holes, the protrusion including a downstream wall extending from the upstream wall toward the hot surface in a downstream direction relative to the direction of the flow of combustion gases; and
   a plurality of effusion holes extending through the liner from the cold surface to the hot surface to direct cooling air into the dilution zone, two or more rows of effusion holes of the plurality of effusion holes positioned within three dilution hole diameters downstream of the plurality of dilution holes, the two or more rows of effusion holes oriented relative to the liner to direct the cooling air in a cooling direction that is at least one of normal to the direction of the flow of combustion gases passing adjacent the effusion holes, and against the direction of the flow of combustion gases passing adjacent the effusion holes.

2. The combustor as defined in claim 1, further comprising a plurality of grommets mounted to the liner and defining the plurality of dilution holes.

3. The combustor as defined in claim 2, wherein one or more of the two or more rows of effusion holes extend through part of the plurality of grommets.

4. The combustor as defined in claim 1, wherein the two or more rows of effusion holes are positioned within two dilution hole diameters downstream of the plurality of dilution holes.

5. The combustor as defined in claim 1, wherein the downstream wall is curved.

6. The combustor as defined in claim 1, wherein one or more of the two or more rows of effusion holes are formed through at least one of the endwall contours.

7. The combustor as defined in claim 1, wherein the plurality of effusion holes include one or more downstream effusion holes positioned downstream of the two or more rows of effusion holes relative to the direction of the flow of combustion gases, the one or more downstream effusion holes oriented relative to the liner to direct the cooling air in the cooling direction that is the same as the direction of the flow of combustion gases.

8. A combustor for an aircraft engine, comprising:
   a doubled-walled combustor liner defining a combustion chamber, the combustor configured to cause a flow of combustion gases to travel through the combustion chamber from a primary zone of the combustion chamber downstream to a dilution zone of the combustion chamber, the doubled-walled combustor liner having an inner skin exposed to the flow of combustion gases and an outer skin, the inner and outer skins defining a gap therebetween, the inner and outer skins having a plurality of dilution holes defined therethrough adjacent a junction between the primary zone and the dilution zone, the inner skin including a plurality of endwall contours partially delimiting the plurality of dilution holes, the plurality of endwall contours having a thickness greater than a thickness of a remainder of the inner skin, the plurality of endwall contours including a protrusion extending into the combustion chamber, a plurality of grommets extending between the inner skin and the outer skin, the plurality of grommets defining the plurality of dilution holes; and the dilution zone having a plurality of effusion holes extending through the inner skin and positioned downstream of the plurality of dilution holes to introduce cooling air into the combustion chamber, two or more rows of effusion holes of the plurality of effusion holes positioned downstream of the plurality of dilution holes relative to a direction of the flow of combustion gases, the two or more rows of effusion holes being the effusion holes of the plurality of effusion holes that are closest to the plurality of dilution holes, each of the two or more rows of effusion holes configured to direct the cooling air into the combustion chamber at an angle that is at least one of normal to the direction of the flow of combustion gases, and against the direction of the flow of combustion gases.

9. The combustor as defined in claim 8, wherein the outer skin includes impingement holes operable to direct the cooling air into the gap.

10. The combustor as defined in claim 8, wherein the inner skin is detachably mounted to the outer skin.

11. The combustor as defined in claim 8, wherein one or more of the two or more rows of effusion holes is partially formed through the plurality of grommets.

12. The combustor as defined in claim 8, wherein the two or more rows of effusion holes are positioned within two to three dilution hole diameters downstream of the plurality of dilution holes.

13. The combustor as defined in claim 8, wherein the protrusion includes an upstream wall extending into the combustion chamber and delimiting the plurality of dilution holes, the protrusion including a downstream wall extending from the upstream wall toward the inner skin in a downstream direction relative to the direction of the flow of combustion gases.

14. The combustor as defined in claim 13, wherein the downstream wall is curved.

15. The combustor as defined in claim 8, wherein one or more of the two or more rows of effusion holes are formed through at least one of the endwall contours.

16. A combustor of an aircraft engine, comprising:

a liner having a hot surface for being exposed to a flow of combustion gases and a cold surface, the liner defining a primary zone of the combustor and a dilution zone of the combustor, the combustor configured to cause the flow of combustion gases to travel through the combustor from the primary zone downstream to the dilution zone;

a plurality of dilution holes extending through the liner from the cold surface to the hot surface, the plurality of dilution holes delimiting the primary zone from the dilution zone and having dilution hole diameters, the liner including a plurality of endwall contours partially delimiting the plurality of dilution holes, the plurality of endwall contours having a thickness greater than a thickness of a remainder of the liner, the plurality of endwall contours including a protrusion extending from the hot surface into the flow of combustion gases, the protrusion including an upstream wall extending from the hot surface and delimiting the plurality of dilution holes, the upstream wall delimiting a volume of the plurality of dilution holes that is free of overlap by the upstream wall; and a plurality of effusion holes extending through the liner from the cold surface to the hot surface to direct cooling air into the dilution zone, two or more rows of effusion holes of the plurality of effusion holes positioned within three dilution hole diameters downstream of the plurality of dilution holes, the two or more rows of effusion holes oriented relative to the liner to direct the cooling air in a cooling direction that is at least one of normal to the direction of the flow of combustion gases passing adjacent the effusion holes, and against the direction of the flow of combustion gases passing adjacent the effusion holes.

17. The combustor as defined in claim 16, further comprising a plurality of grommets mounted to the liner and defining the plurality of dilution holes.

18. The combustor as defined in claim 16, wherein the two or more rows of effusion holes are positioned within two dilution hole diameters downstream of the plurality of dilution holes.

19. The combustor as defined in claim 16, wherein one or more of the two or more rows of effusion holes are formed through at least one of the endwall contours.

20. The combustor as defined in claim 16, wherein the plurality of effusion holes include one or more downstream effusion holes positioned downstream of the two or more rows of effusion holes relative to the direction of the flow of combustion gases, the one or more downstream effusion holes oriented relative to the liner to direct the cooling air in the cooling direction that is the same as the direction of the flow of combustion gases.

* * * * *